Figure 1:
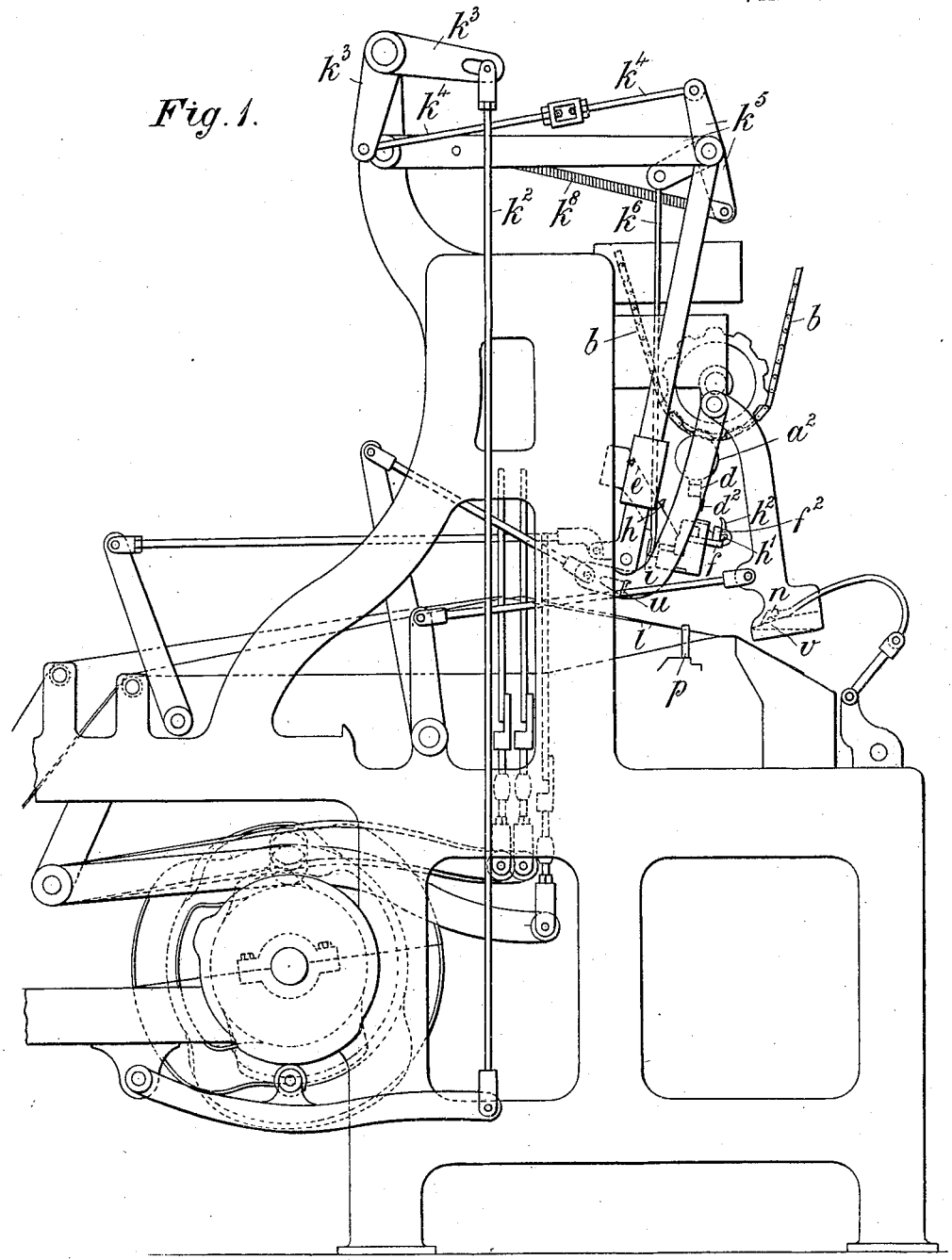

No. 891,147. PATENTED JUNE 16, 1908.
T. COOPER.
LOOM FOR THE WEAVING OF TUFTED FABRICS.
APPLICATION FILED FEB. 19, 1907.

7 SHEETS—SHEET 1.

Witnesses:—

Inventor:—
Thomas Cooper

No. 891,147. PATENTED JUNE 16, 1908.
T. COOPER.
LOOM FOR THE WEAVING OF TUFTED FABRICS.
APPLICATION FILED FEB. 19, 1907.

7 SHEETS—SHEET 2.

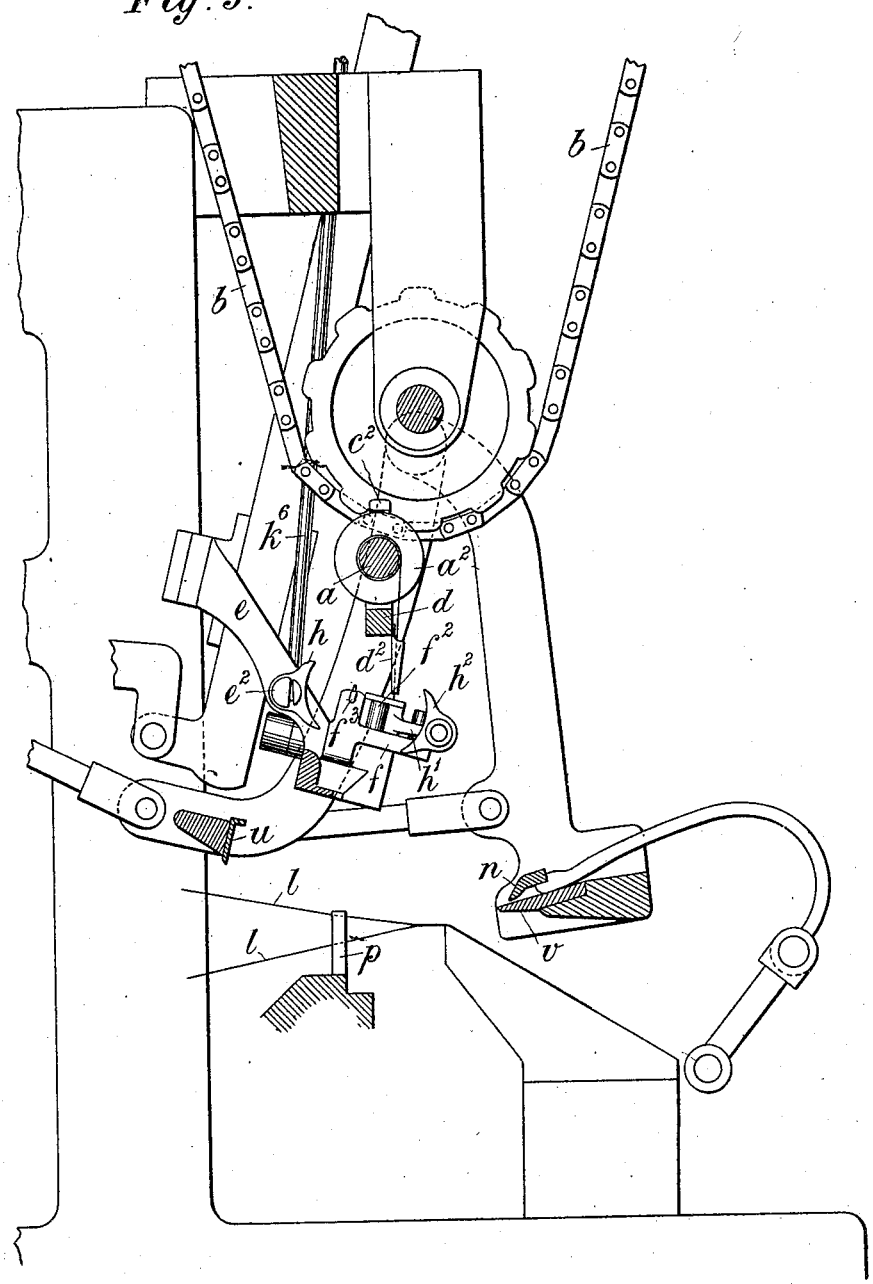

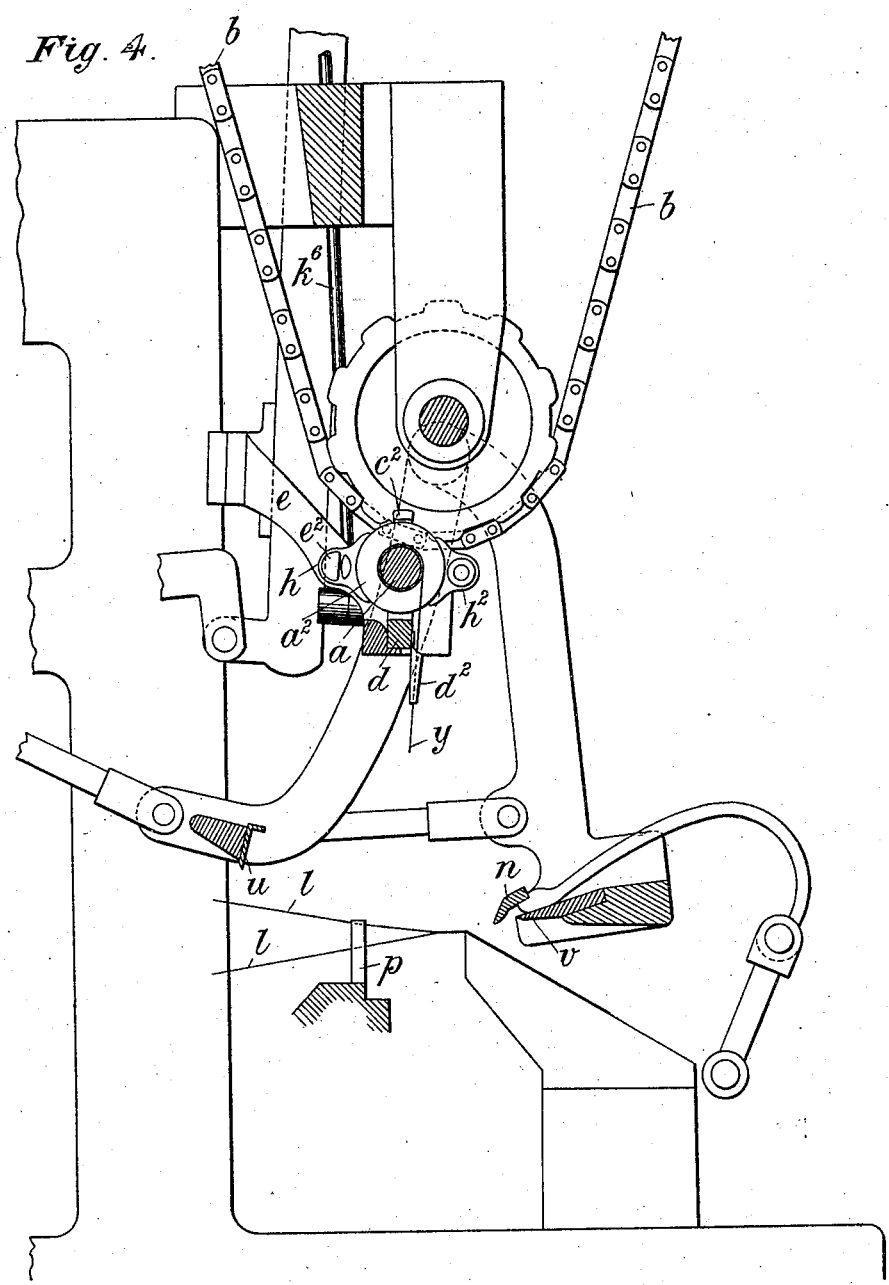

No. 891,147. PATENTED JUNE 16, 1908.
T. COOPER.
LOOM FOR THE WEAVING OF TUFTED FABRICS.
APPLICATION FILED FEB. 19, 1907.
7 SHEETS—SHEET 5.
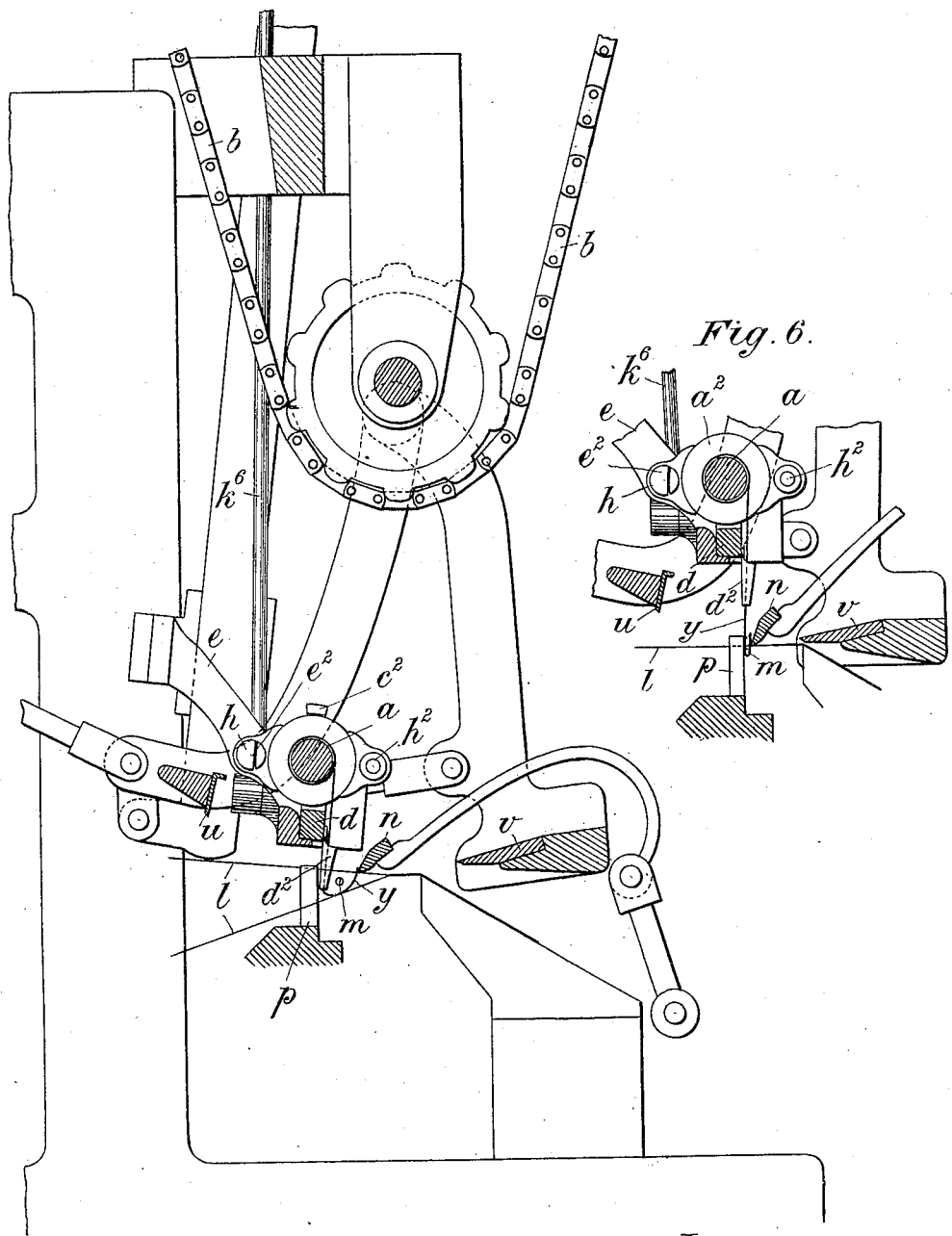

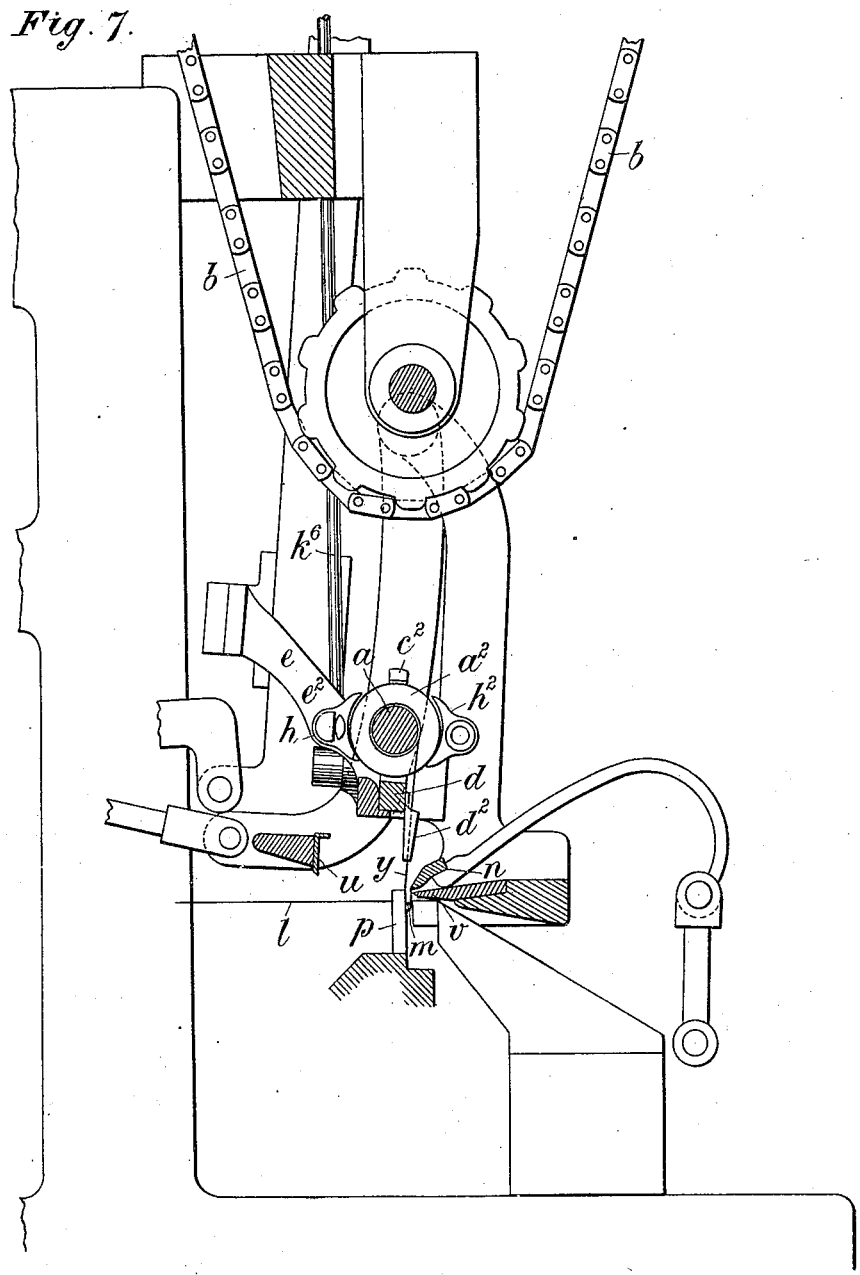

No. 891,147. PATENTED JUNE 16, 1908.
T. COOPER.
LOOM FOR THE WEAVING OF TUFTED FABRICS.
APPLICATION FILED FEB. 19, 1907.
7 SHEETS—SHEET 7.

Witnesses:—

Inventor;
Thomas Cooper
By James L. Norris
Atty.

THE NORRIS PETERS CO., WASHINGTON, D. C.

UNITED STATES PATENT OFFICE.

THOMAS COOPER, OF KIDDERMINSTER, ENGLAND.

LOOM FOR THE WEAVING OF TUFTED FABRICS.

No. 891,147.     Specification of Letters Patent.     Patented June 16, 1908.

Application filed February 19, 1907. Serial No. 358,331.

*To all whom it may concern:*

Be it known that I, THOMAS COOPER, a subject of the King of Great Britain, residing at Farfield, Kidderminster, England, have invented certain new and useful Improvements in Looms for the Weaving of Tufted Fabrics, of which the following is a specification.

My invention relates to looms for weaving tufted or pile fabrics, such for example as Axminster carpets and rugs, of the kind described and represented in the specifications of British Patents No. 2410 of 1891; Nos. 980 and 981 of 1893 and No. 24519 of 1894, the tuft yarns being introduced into the fabric by tube frames, each tube frame carrying a bobbin on which the tuft yarns are wound, or by needles, and my invention consists of the improvements hereinafter described in the said looms whereby the waste produced in the cutting and trimming of the tuft yarns is very materially reduced and the working of the loom is rendered more efficient.

In order that my invention may be the better understood I remark that in the weaving of Axminster carpets and rugs in looms of the kind referred to, as ordinarily practiced, the "shed" is preserved open during the introduction of the tuft yarns to form the pattern and pile of the fabric and during the introduction of the shot of weft and the bringing of the ends of the tuft yarns, doubled, on the shot of weft, by the reed and tuft arrester or nipper up to the fell of the fabric; in consequence of the "shed" being preserved open during the several operations described the tuft arrester or nipper, which when advanced toward the reed is supported by the upper plane of the warps effects the gripping of the tuft yarns at or near their extreme ends, consequently the whole of the tuft yarns between the said ends and the bobbins is under tension when the cutting operation takes place. In consequence of the varying elasticity of the yarns an unevenness in the ends of the tufts is frequently produced, and in the cutting and trimming operation a waste results which by my invention is reduced to a minimum.

I will describe my invention in connection with a loom in which the tuft yarns are carried by bobbins and tube frames of the ordinary kind so much only of the loom being represented in the accompanying drawings as is necessary to the proper understanding of my invention.

Figure 2:
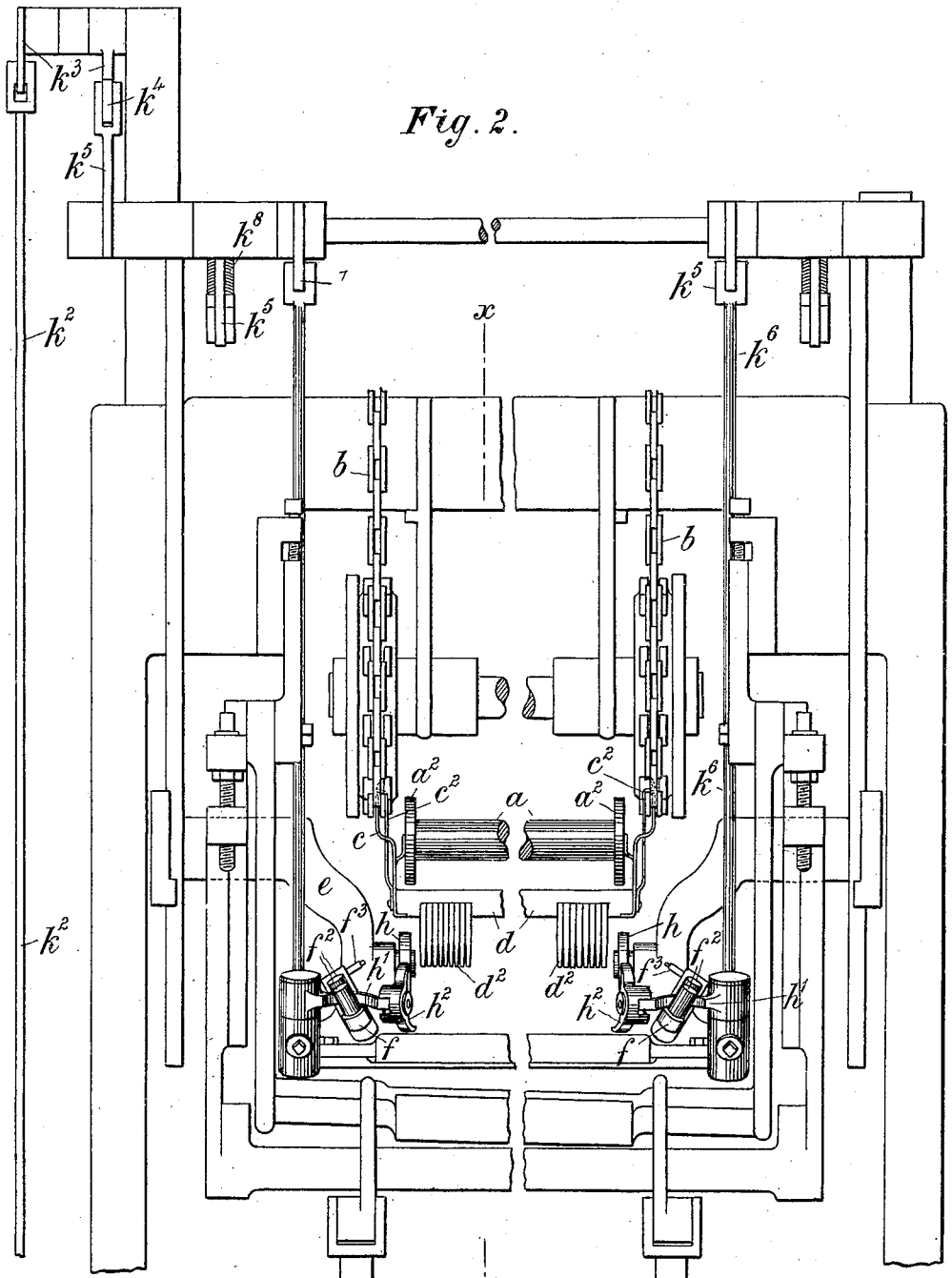

Figure 1 of the accompanying drawings represents in side elevation the main portion of an Axminster loom, of the kind herein before referred to, to which my invention is applied. Fig. 2 is a front elevation of the same drawn to a larger scale than Fig. 1. Fig. 3 is a vertical section on the dotted line $x, x$ Fig. 2, and Figs. 4, 5, 6 and 7 are similar views illustrating with the said Fig. 3, the essential features of my invention. Figs. 8 to 14 both inclusive are views of portions of the loom hereinafter particularly described.

The same letters of reference indicate the same parts in the several figures of the drawings.

In carrying my invention into effect I provide for a shorter projection of the tuft yarns $y$ from the quills or tubes $d^2$ of the tube frames $d$ than is usual, and I effect the closing of the "shed", or the lowering of the upper plane of the warps $l, l$ immediately after the introduction of the shot of weft $m$ on which the ends of the tuft yarns are to be doubled. By this means the tuft arrester or nipper, marked $n$, when moved up to the reed $p$ for doubling the tuft yarns on the shot of weft $m$ and gripping the tuft yarns, effects the said gripping in a line below the upper edge of the reed $p$ and the end portions of the tuft yarns projecting or standing above the tuft arrester or nipper are not submitted to tension in the subsequent simultaneous movement of the reed $p$ and tuft arrester or nipper $n$ for carrying the doubled ends of the tuft yarns and shot of weft up to the fell of the fabric.

The tuft yarns $y$ are carried by bobbins $a$, $a^2$ one only of which is represented the series of which bobbins are attached to and suspended from the intermittently driven endless chains $b, b$ of the loom by the spring arms $c^2, c^2$ of the metal fittings $c, c$ on the ends of the tube frames or bars $d$ as is usual.

It will be understood by those conversant with the looms hereinbefore referred to that each time the intermittently driven chains $b$ come to rest one of the series of bobbins $a, a^2$ is brought into such a position that it can be temporarily detached by the transferrer of the loom for the purpose of introducing the tuft yarns into the fabric.

During the greater part of the time that the bobbins $a, a^2$ are one by one temporarily detached from the chains $b$, $b$ by the transferrers of the loom it is essential that the said bobbins $a$, $a^2$ shall be held against movement on their axes. To prevent such movement a pair of endwise grippers have been heretofore employed the pressure of which on the opposite ends of the bobbins has tended to prevent their partial rotation but to insure greater efficiency and prevent the possibility of any angular movement of the same I have devised the special construction of clutch hereinafter described whereby a peripheral grip on the flanges $a^2$ of the bobbins $a$, $a^2$ is obtained instead of an endwise grip.

Figure 8:
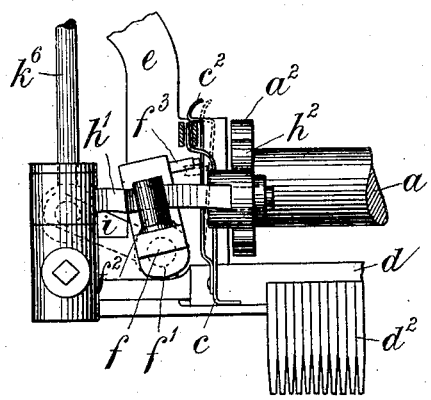
Figure 12:
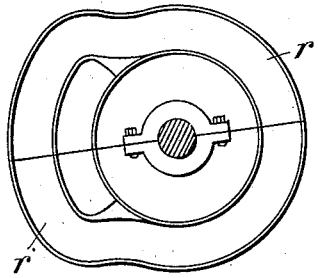
Figure 9:
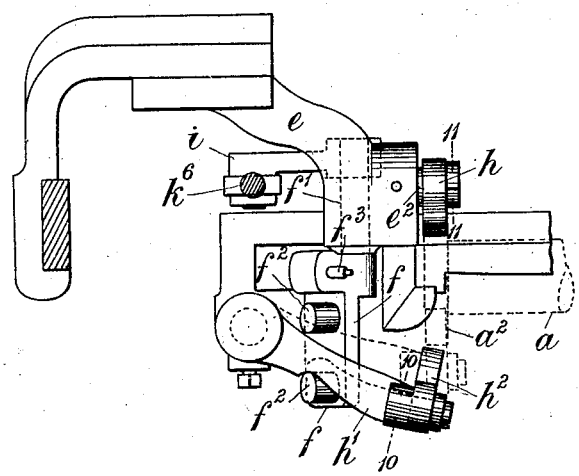
Figure 13:
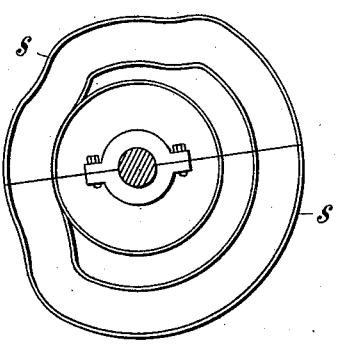
Figure 14:
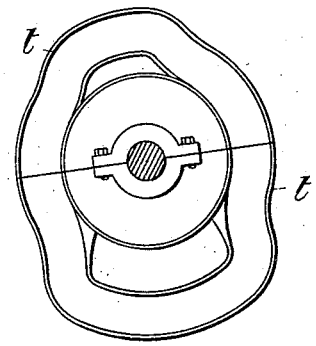

To obtain the peripheral grip referred to the clutch employed for each flange $a^2$ of the bobbin $a$, $a^2$ consists essentially of a pair of pivoted crescent shaped gripping jaws marked respectively $h$, $h^2$ and best seen in Figs. 3 to 9 both inclusive; Fig. 8 represents in front elevation one of the clutches detached nearly fully closed and Fig. 9 represents a plan of the same open.

The crescent shaped jaw $h$ of each clutch is mounted on a pin $e^2$ attached to the side arm or bracket $e$ of the transferring mechanism of the loom which mechanism is operated in the ordinary way. The other crescent shaped jaw $h^2$ is pivoted to the end of a jointed arm $h'$ best seen in Figs. 8 and 9 which receives an angular motion by the action on its edges of the arms or prongs $f^2$, $f^2$ of a forked bar $f$ integral with a rocking spindle $f^1$ which is rocked in a bearing in the arm or bracket $e$ as is hereinafter described.

Figure 10:
Figure 11:

Both crescent shaped jaws $h$, $h^2$ are capable of a limited angular motion on their pins or pivots and each is under the action of a spring as will be best understood by reference to Figs. 10 and 11 which springs tend to preserve the upper ends of the jaws at their maximum distance apart as is illustrated in Fig. 3. Figs. 10 and 11 are sections taken on the dotted lines 10—10 and 11—11 respectively of Fig. 9.

When the bobbin clutches $h$, $h^2$ are lifted by the transferring mechanism of the loom into the position represented in Fig 4 for the purpose of temporarily detaching one of the bobbins from the chains $b$, $b$ the jaws $h$, $h^2$ of the clutches are closed tightly on the peripheries of the flanges $a^2$ $a^2$ of the bobbin $a$ and the spring arms $c^2$ $c^2$ are pressed inwards by pins $f^3$ on the forked bars $f$ as is indicated in dotted lines in Fig. 8 so as thereby to release the bobbin and its carrier $c$, $c^2$ from the chains $b$, $b$.

The rocking spindle or axis $f^1$ of the forked bar $f$ is turned in the direction proper for causing the arms or prongs $f^2$, $f^2$ to operate the jointed arm $h^1$ and make the jaw $h^2$ approach the jaw $h$ by the turning of the arm or crank $i$ pinned or cottered to the rear end of the spindle $f^1$, the turning of the said arm $i$ being effected by the cam $k$ on one end of the cam shaft of the loom the said cam acting through the levers and links or connecting rods $k^1$, $k^2$, $k^3$, $k^4$, $k^5$ and $k^6$ the roller $k^7$ being kept to its bearing against the cam $k$ by the coiled springs $k^8$.

When the jaw $h^2$ is made to approach the jaw $h$ the clutches are brought to their bearing on the peripheries of the flanges $a^2$ of the bobbin $a$ the said jaws turning against the action of their springs until the peripheral grip is uniform the parts taking the positions represented in Fig. 4. The transferrer then lowers the bobbin clutches and firmly held bobbin $a$ for the purpose of doubling the depending ends of the tuft yarns and carrying the lower ends of the quills or tubes $d^2$ into the open shed of the warps $l$, $l$ as is illustrated in Fig. 5. The shot of weft $m$ having been passed through the open shed (see Fig. 5) the said shed is closed as is illustrated in Fig. 6 and the tuft arrester or nipper $n$ which is moved backward along the warps is permitted to pinch or grip the doubled ends of the tuft yarns against the reed $p$ in a line below the top edge of the said reed. The closing of the shed at this early period in the motions of the parts constitutes one of the essential features of my invention and is effected by a modification in shape of the three cams $r$, $s$, $t$ for controlling the warps $l$ the said modified cams being shown detached in Figs. 12, 13 and 14 respectively. Instead of closing the shed in the way described and illustrated the same or nearly the same effect may be obtained by lowering the upper plane of warps. The doubled ends of the tuft yarns are then carried by the simultaneous forward movement of the reed $p$ and tuft arrester $n$ up to the fell of the fabric as is usual the grip of the bobbin clutches on the flanges $a^2$ of the bobbin $a$ being slightly relaxed as is illustrated in Fig. 7 so as to permit the tuft yarns to be drawn off the bobbin to the extent necessary to provide for the next feed of tuft yarns. When the blades $u$, $v$ are brought together for the cutting and trimming of the tuft yarns the bobbin is again firmly gripped and it is not subsequently released until it has been lifted up to the chains $b$, $b$ by the operations of the transferrer.

Having now described my invention what I claim as new and desire to secure by Letters Patent is:—

1. A loom comprising a bobbin for supplying tuft yarns into the shed, a transferring means for moving the bobbins from one point to another, said transferring means containing clutch mechanism for peripherally gripping the heads or flanges of the bobbin.

2. A loom comprising a series of quill frames, bobbins mounted in the frames for supplying tufted yarns, means for intermittently moving the frames, transferring mechanism for receiving the frames and having gripper jaws for peripheral engagement with the heads of the bobbins, and cam mechanism for actuating the transferring mechanism to shift the frames into working position and also the jaws.

3. In a loom having tube frames movable from one position to another, bobbins carried by the frames, transferring mechanism for bringing the frames to a working position, arms pivotally connected to the said mechanism, tensioned jaws carried by the arms for peripheral engagement with the heads of the bobbins, and cam actuated mechanism for operating the arms to close the jaws on the periphery of the bobbin heads.

4. In a loom, transferring mechanism, means for supporting a bobbin carrying the tufted yarns and adapted to be received by the transferring mechanism and shifted thereby to operative working position, pivotal arms carried by the transferring mechanism, crescent shaped gripper jaws pivotally associated with the arms and the transferring mechanism, respectively, springs acting on said jaws to allow slight yielding of the latter, movable elements operative upon the arms to bring the jaws into peripheral contact with the heads of the bobbin, and cam actuated mechanism associated with the movable elements for operating the arms to close the jaws on the periphery of the bobbin heads.

5. In a loom, transferring mechanism, means for supporting a bobbin carrying the tufted yarns and adapted to be received by the transferring mechanism and shifted thereby to operative working position, pivotal arms carried by the transferring mechanism, crescent shaped gripper jaws pivotally associated with the arms and the transferring mechanism, respectively, springs acting on said jaws to allow slight yielding of the latter, movable elements operative upon the arms to bring the jaws into peripheral contact with the heads of the bobbins, cam actuated mechanism associated with the movable elements for operating the arms to close the jaws on the periphery of the bobbin heads, and mechanism for actuating the transferring mechanism.

6. In a loom, transferring mechanism, means for supporting a bobbin carrying the tufted yarns supply and adapted to be received by the transferring mechanism and shifted thereby to operative working position, pivotal arms carried by the transferring mechanism, crescent shaped gripper jaws pivotally associated with the arms and the transferring mechanism, respectively, springs acting on said jaws to allow slight yielding of the latter, movable elements operative upon the arms to bring the jaws in peripheral contact with the heads of the bobbin, means for forming the shed, a movable reed, nippers for doubling and gripping the tufted yarns below the uppermost edge of said reed, means for moving the reed and nippers towards each other to cause the doubling of the tufted yarns and the gripping of the same by the nippers, cam actuated mechanism associated with the movable elements for operating the arms to close the jaws on the heads of the bobbin, and cam mechanism for actuating the transferring mechanism.

7. In a loom having an intermittently driven chain and transferring mechanism, tube frames detachably connected with the chain, tufted yarn supporting bobbins mounted in the tube frames, tension controlled closing jaws pivotally connected to the transferring mechanism for clutching the heads of the bobbins, and cam operated mechanism for actuating the transferring mechanism and also said jaws to grip the heads of the bobbins.

8. In a loom, a bobbin for supporting tufted yarn, transferring mechanism for shifting the bobbin to operative position, oppositely disposed gripper jaws associated with the transferring mechanism and adapted for peripheral engagement with the bobbin, means for forming a shed, a reed, nipper mechanism for doubling and gripping the tufted yarn against the reed below the uppermost edge thereof, and cam actuated mechanism for operating the jaws to close the same against the periphery of the heads of the bobbin and also for moving the nippers in working relation to the reed.

9. In a loom, a bobbin for supporting tufted yarn, transferring mechanism for shifting the bobbin to operative position, oppositely disposed gripper jaws associated with the transferring mechanism and adapted for peripheral engagement with the bobbin, means for forming a shed, a reed, nipper mechanism for doubling and gripping the tufted yarn against the reed below the uppermost edge thereof, cam actuated mechanism for operating the jaws to close the same against the periphery of the heads of the bobbin and also for moving the nippers in working relation to the reed, and mechanism for cutting the tufted yarn subsequent to the doubling thereof.

10. A loom having a bobbin for supplying tuft yarns into the shed formed by the warps, a transferring device for moving the bobbin into and out of operative position relatively to the shed, and clutch mechanism carried by and movable with the transferring device for peripherally engaging a head or flange of the bobbin.

11. A transferring mechanism for looms provided with front crescent-shaped gripping jaws carried by pivoted arms, the said front jaws acting in conjunction with similar rear gripping jaws arranged on pins projecting from the said arms or brackets of the transferrer to peripherally grip the heads or flanges of the bobbins, the pivoted arms of the front gripping jaws when actuated pressing the flanges or heads of the bobbins against the rear gripping jaws and thereby insuring gripping of the flanges of each bobbin in the same position with respect to the tube frame depending therefrom.

12. A transferring mechanism for looms embodying a tube frame, a pair of relatively movable gripping devices movable with the transferrer and the tube frame and adapted to engage the peripheries of the bobbin flanges and position the same relatively to the tube frame, the relatively stationary gripping device being in fixed relation to the tube frame and serving to index the bobbin with respect thereto.

13. A loom comprising the combination with mechanism for doubling the ends of tuft yarns as the latter are inserted into the open shed, and mechanism for moving the weft forward and backward through the open shed and through the loops of the double ends of tuft yarns, of mechanism for controlling the warps to immediately lower the upper plane of warps upon the inserted weft and a nipper to grip the tuft yarns against the reed below the top edge thereof.

14. A loom comprising the combination with mechanism for doubling the ends of the tuft yarns as the latter are carried down and inserted into the open shed and mechanism for moving the weft forward and backward through the open shed and through the loops of the tuft yarns therein, of mechanism for controlling the warps to immediately close the shed upon the inserted weft and a nipper to grip the tuft yarns against the reed below the top edge thereof.

In testimony whereof I have signed my name to this specification in the presence of two subscribing witnesses.

THOMAS COOPER.

Witnesses:
GEORGE JAMES HUMPHERSON,
ARTHUR GILL.